June 20, 1967 B. P. LOKEY 3,326,097
APPARATUS FOR FORMING TUBE
Filed March 30, 1964 12 Sheets-Sheet 1

INVENTOR
BURKE P. LOKEY

BY *Thomas W. Flynn*

ATTORNEY

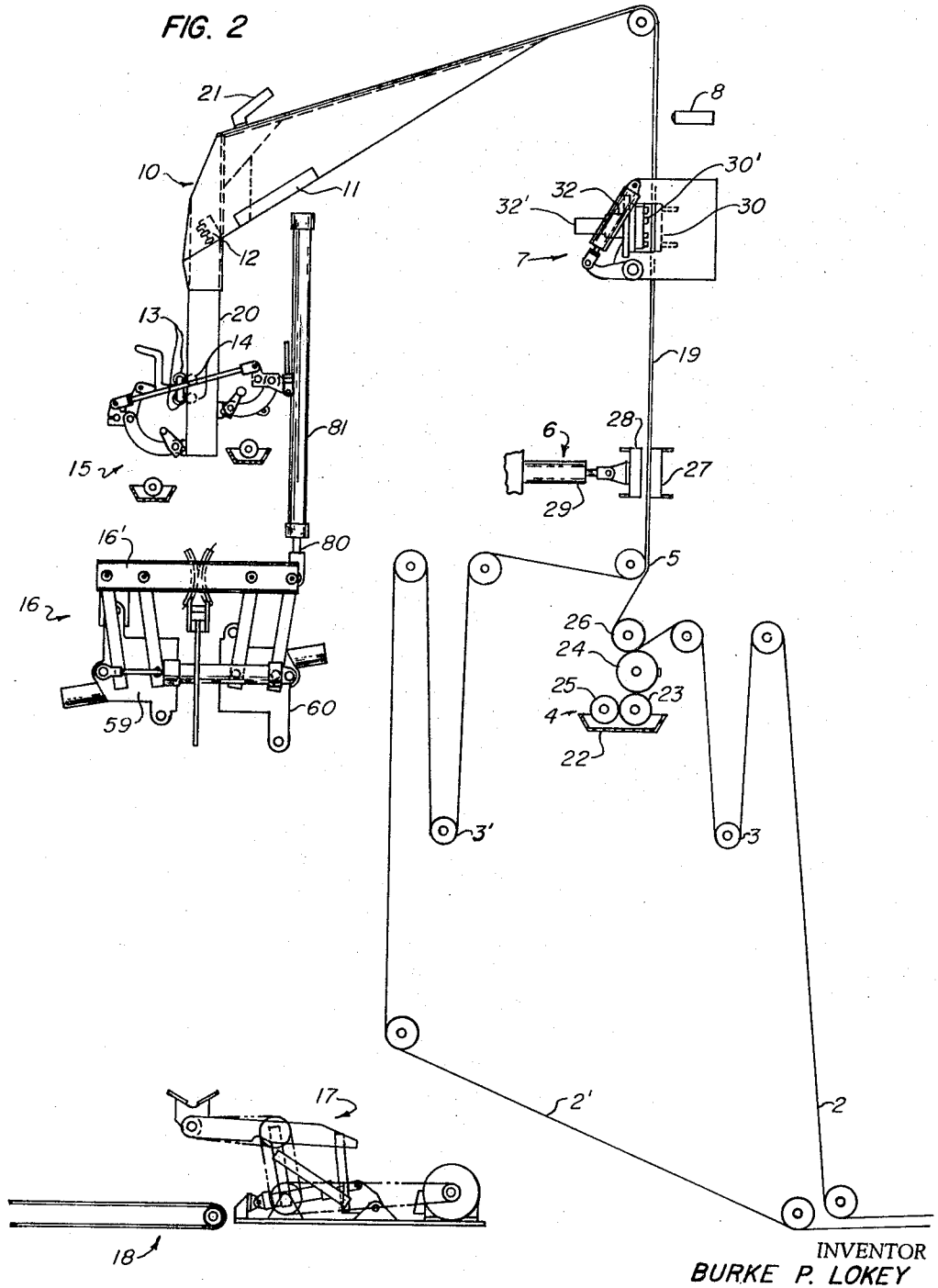

INVENTOR
BURKE P. LOKEY

ATTORNEY

June 20, 1967  B. P. LOKEY  3,326,097
APPARATUS FOR FORMING TUBE
Filed March 30, 1964  12 Sheets-Sheet 4

INVENTOR
BURKE P. LOKEY

BY Thomas W. Flynn

ATTORNEY

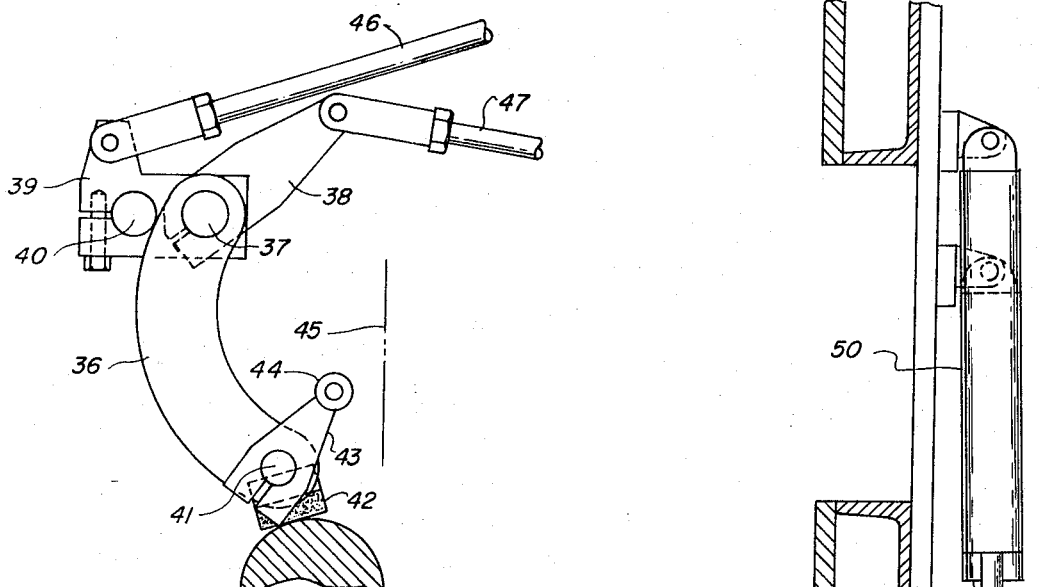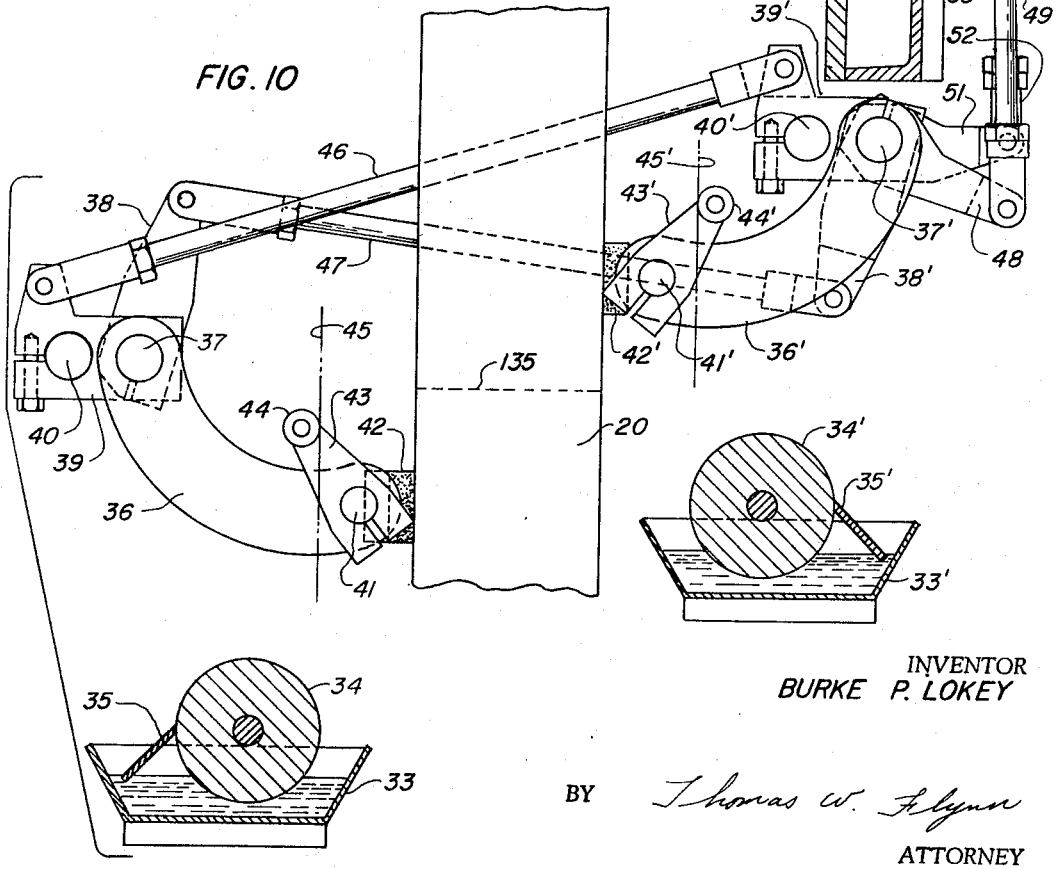

June 20, 1967

B. P. LOKEY 3,326,097

APPARATUS FOR FORMING TUBE

Filed March 30, 1964

INVENTOR
BURKE P. LOKEY

BY Thomas W. Flynn

ATTORNEY

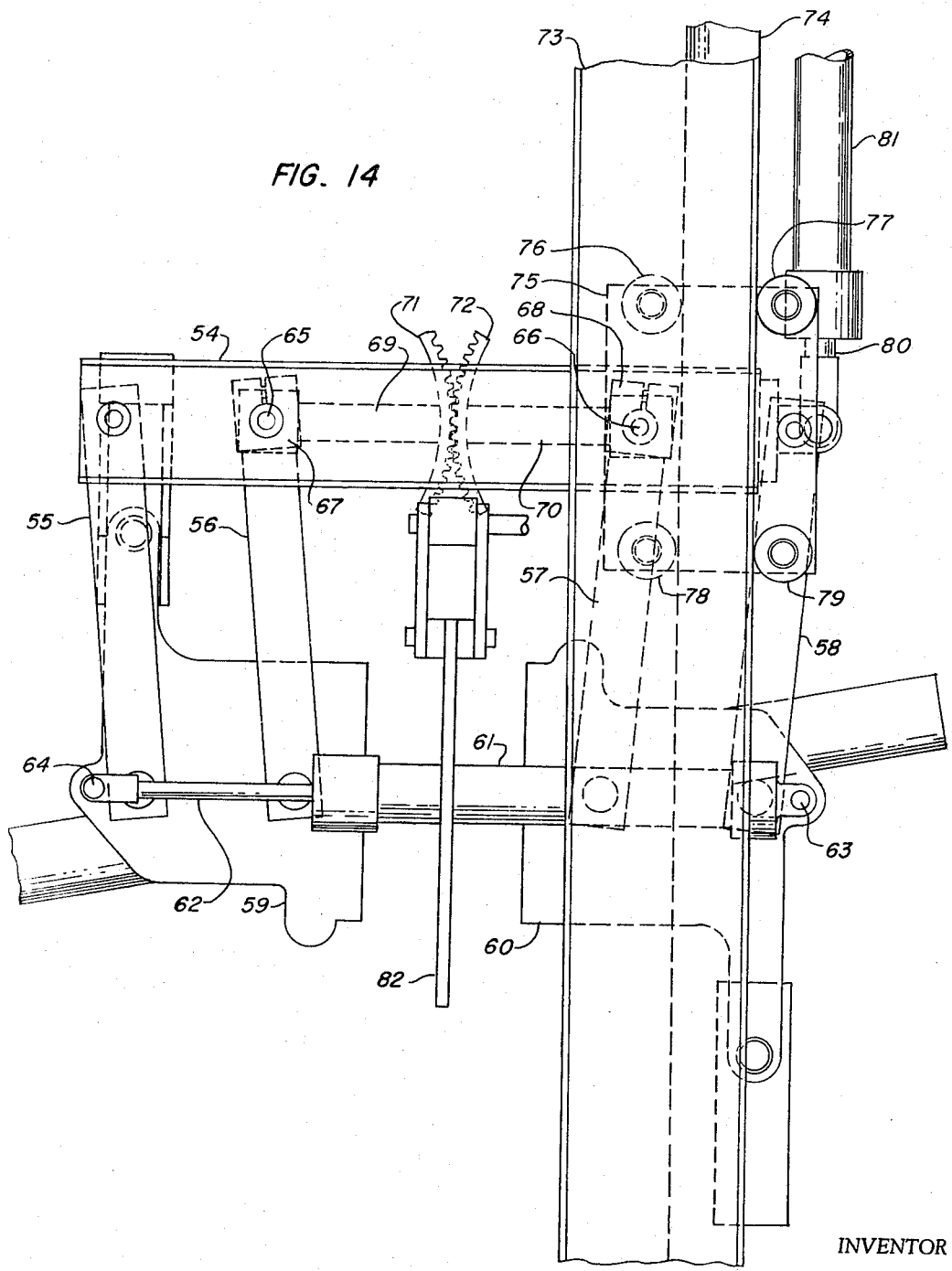

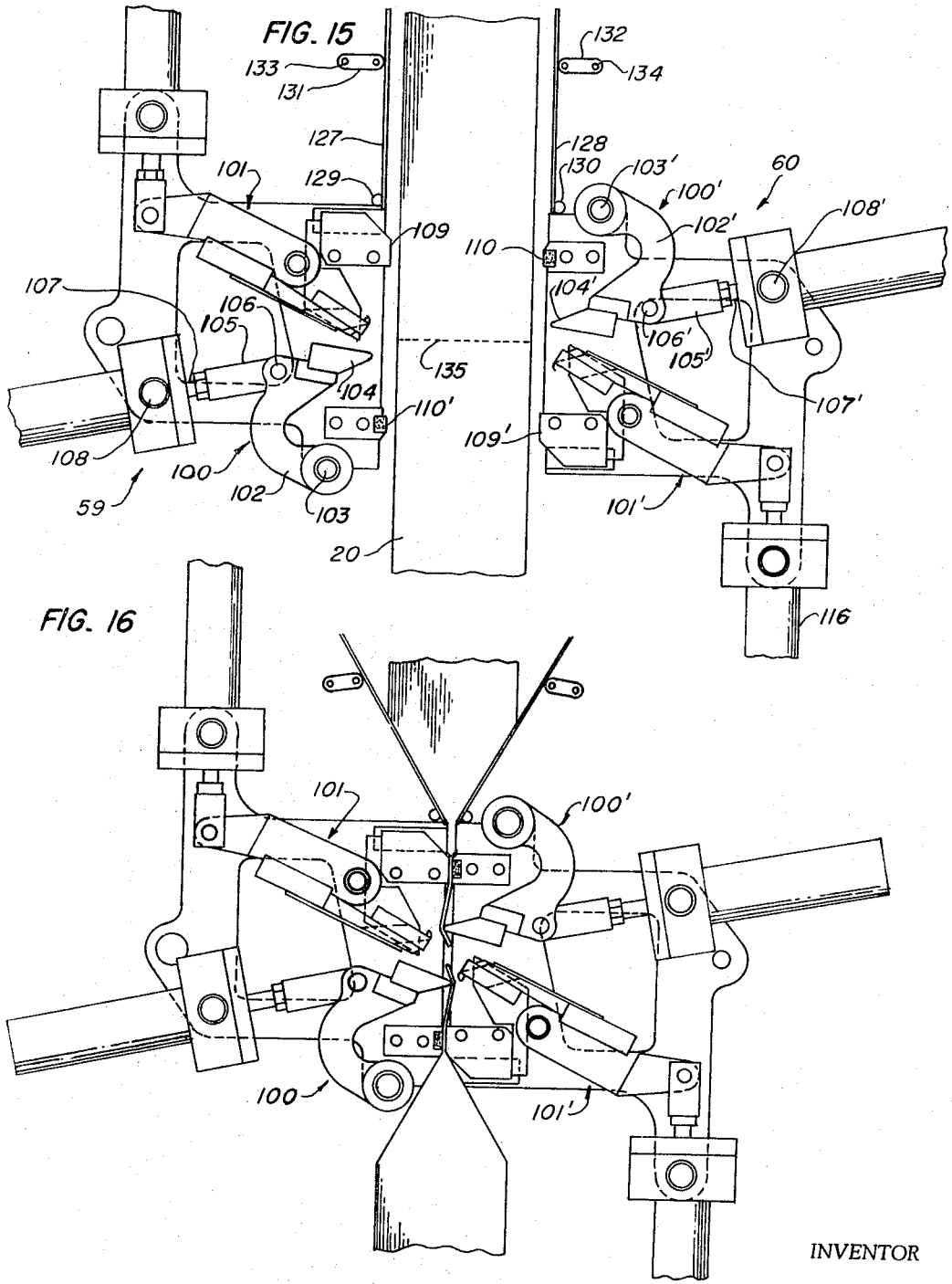

June 20, 1967  B. P. LOKEY  3,326,097
APPARATUS FOR FORMING TUBE
Filed March 30, 1964  12 Sheets-Sheet 9

INVENTOR
BURKE P. LOKEY

BY *Thomas W. Flynn*
ATTORNEY

June 20, 1967 B. P. LOKEY 3,326,097
APPARATUS FOR FORMING TUBE
Filed March 30, 1964 12 Sheets-Sheet 10

INVENTOR
BURKE P. LOKEY

BY Thomas W. Flynn
ATTORNEY

June 20, 1967 B. P. LOKEY 3,326,097
APPARATUS FOR FORMING TUBE
Filed March 30, 1964 12 Sheets-Sheet 11

INVENTOR.
BURKE P. LOKEY
BY Thomas W. Flynn
ATTORNEY

June 20, 1967 B. P. LOKEY 3,326,097
APPARATUS FOR FORMING TUBE
Filed March 30, 1964 12 Sheets-Sheet 12

INVENTOR.
BURKE P. LOKEY
BY
Thomas W. Flynn
ATTORNEY

United States Patent Office 3,326,097
Patented June 20, 1967

3,326,097
APPARATUS FOR FORMING TUBE
Burke P. Lokey, Valley Ridge, Covington, Va., assignor to West Virginia Pulp and Paper Company, New York, N.Y., a corporation of Delaware
Filed Mar. 30, 1964, Ser. No. 355,877
5 Claims. (Cl. 93—82)

The present invention pertains to a novel apparatus for forming a web of sheet material of indefinite length into a tube.

It is estimated that at present, approximately 2½ billion paper bags are used annually in the United States for the packaging of relatively heavy products, such as cement, fertilizer, feed and the like. Despite this sizable volume, packaging of this type of product is still accomplished for the most part by manual, or, at best, semi-automatic methods.

For example, in traditional industry practice, two distinct operations are generally necessary to provide a filled, sealed bag. First, the bag manufacturer constructs either finished or semi-finished sacks, bales these sacks together and ships them to the packager. Next, upon receipt of the bales of sacks by the packager, they must be unpacked, then filled and sealed. Obviously, the fact that the bags are formed and then packaged for shipment at one point and then unpackaged, filled and sealed at another, results in shipping and handling costs that would be unnecessary if the bags were formed, filled and sealed at one point in a continuous operation.

The sacks described above as finished or semi-finished are the types generally referred to as open mouthed or valved bags, respectively; either of which may be of sewn or pasted construction.

In forming open mouth pasted sacks, the bag manufacturer usually first forms a tube of packaging material which is then cut into suitable bag lengths. These short lengths of tubing are then fed into a bottoming machine which folds and glues the end closures in place. Bottoming equipment of this type is of fairly recent design, quite complex in both design and function, and hence, readily subject to mechanical difficulties which often cause jamming and end malformations. Consequently, although the theoretical operating speeds of these machines are fairly high, the net operating speeds are much lower due to downtime required to make adjustments and remove jams. Additionally, waste in this operation will usually run quite high.

After the bottoms of the bags are folded and pasted in the bottoming machine, the partially formed open mouth bags are fed into a long pressure conveyor which holds the bottoms in place until the adhesive has had time to set. This operation is quite critical since the pressure must be sufficient to hold all folds firmly in place while the adhesive cures, yet must not be so great that the adhesive is caused to squeeze into areas where bonding is not desired.

Where a sewn end closure is used for the open mouth sacks, the equipment used is not as complex as that required in the bottoming operations described above. However, the sewn closures are accomplished with a great many more manual operations and hence, while not subject to the mechanical difficulties of the pasted end closure process, are inherently more time consuming. For example, in the pasted bottoming machine, the bag lengths of tubing may be placed in a magazine for automatic feeding; whereas, in forming sewn end closures, the feeding operation is carried out by hand. Additionally, the operating speed of the sewing machine is generally much slower than that of pasted bottomer.

The second major type of bag produced is that referred to as valved construction. In this type of sack, both ends of the bag are closed but a small unsealed portion is left in the folds of one end through which a packing spout may be inserted for filling of the bag. After filling, the weight of the material within the bag is depended upon to press against the unsealed portion of the end seam and prevent leakage. Obviously, the time, labor, and equipment requirements for the production of the open mouth sack are greatly increased where both ends of the sack are closed, as in the valved construction. It will also be noted that in addition to this increased requirement, further operations are required to provide the valve or opening in the end of the bag. This is particularly true where the valve bag is of the sleeved type; wherein a tube of flexible material is secured in the valve opening to permit ready filling. While this type of construction provides a better defined filling aperture and may be positively closed after filling to provide a more sift-proof container, the sleeving operation is a manual one and hence, quite tedious and, of course, requires additional material. While the latter may seem inconsequential, the increased cost is significant when considered in the present context of high volume production.

As noted previously, after the sewn or pasted, valved or open mouth sacks are formed by the bag manufacturer, they are either packaged in bundles or palletized for shipment to the packager or consumer. Upon receipt by the consumer, the bags are placed in storage and withdrawn as needed. As in the formation of the bags, the filling and sealing is generally carried out with a great deal of manual labor. Thus, depending upon the degree of automation in the packager's plant and the type of bag being packed, the filling and sealing operation may be carried out at a rate of from 6 to 20 sacks per minute. For example, in the filling of open mouth sacks, which is of somewhat slower process than filling valved bags, rates of from 6 to 14 sacks per minute may be obtained with a crew of from 1 to 3 men. Filling valved bags on the other hand, while still for the most part manual, may generally be carried out at a greater rate of speed through the use of multiple spout packers.

It will be apparent that, regardless of whether an open mouth or valved bag is used, two distinct operations, at spaced locations, are required. First, the bag manufacturer must form a finished or semi-finished sack and second, the packager must fill and seal the bags. Because of this, under present practices the operations required to form a filled, sealed sack are necessarily time consuming and inefficient. Additionally, the cost of packaging and transporting the bags to the packager is a significant one. Although the valved bag may be filled and sealed more quickly than the open mouth sack, the latter is much more easily produced by the bag manufacturer and hence, the price difference between the two will be apparent. Thus, considering the overall operation from initial bag formation to final sealing, it will readily be seen that any economies effected in bag formation result in greater bag filling and sealing expenses; whereas, more efficient bag filling and sealing may be attained only at the expense of more complicated bag manufacturing processes and hence, higher cost to the packager.

In recent years, machines such as that shown in the patent to McCalley, 3,008,278, and referred to as form, fill and seal apparatus, have proven acceptable in the packaging of light-weight products, such as potato chips, in relatively small volume bags.

In this type of machine, a web of heat sealable material is trained around a curved surface and through an annular space to form a tube. The longitudinal edges of the tube are then joined and the end of the tube sealed. Next, a charge of the filling material is inserted in the tube, a second transverse seal formed spaced from the end seal to form a closed bag, and this bag severed from the tube. The operation is then repeated.

While, as noted above, this type of equipment has found acceptance in the packaging of light-weight products in small volume sacks, certain inherent characteristics of these machines render them unsatisfactory for packaging relatively heavy material such as cement, feed, fertilizer, and the like, which require fairly large sacks of strong material.

Thus, since the longitudinal seam and end closures in this type of machine are formed by clamping and applying heat, the packaging material, of necessity, is limited to that of the heat sealable type. Since a substantial price differential exists between heat sealable packaging materials and flexible wrappers of the type exemplified by paper, high volume packages of the former are not competitive with packages of more conventional materials even though the packaging operation itself, in machines which use heat sealable material, is much more economic than manual or semi-automatic packaging methods.

Additionally, where high strength and sifting of products are a consideration, it is generally desirable to form the sacks of multi-ply construction. It will readily be seen, that where heat sealing is relied upon for forming seals, there is a limit to the number of plies that may be successfully or practically sealed since heat transfer to the innermost plies becomes increasingly difficult as the number plies is increased.

Another characteristic of present form, fill and seal machines which deserves comment is the manner in which the webs of packaging material are formed into tubular shape. Thus, in all prior art machines of which applicant is aware, the curved surface which serves as a tube former represents, at best, merely an approximation of the development of a flat to a curved shape. Therefore, rather than the packaging material passing smoothly over the tube former surfaces with all portions of the web under uniform tension, some portions of the web are loose or slack while others are unduly stressed; resulting in wrinkles, stretching, and in extreme cases, tears. Additionally prior art tube formers are generally formed as compound curves, rendering their fabrication somewhat difficult.

The present invention seeks to overcome these disadvantages, and while obviating the necessity of manual operations, provide a process and apparatus for producing large, multi-ply packages free of wrinkles and tears, of a variety of packaging materials.

In carrying out the process of the present invention, the packager is provided with rolls of suitable packaging material and in a fully automatic process, the material is formed into multi-ply bags filled with the packager's product, sealed and delivered to a conveyor for shipment to customers.

In one embodiment of the present invention, the rolls of packaging material are ordinary stock rolls, except that the roll which is to form the outermost ply may be printed if desired. The apparatus then laminates the packaging material into a multi-ply web, perforates this web into suitable bag lengths, shapes the laminated, perforated web into an elongated tube and provides this tube with folded transverse seals; thereby enclosing a previously inserted product in a strong, multi-ply bag.

Alternatively, the packager may be supplied with a single roll of multi-ply packaging material, perforated at bag length intervals and printed on one side if desired. In this embodiment, although the cost of the prepared material is somewhat greater than rolls of stock material, the initial cost of the apparatus will be less since the need for laminating and perforating equipment is obviated.

Regardless of whether the bag material supplied the packager is prepared or stock material, the need for present, manual operations is completely eliminated.

Additionally, while the packaging operation is completely automatic, the end closures are of the shear-resistant type usually formed by the manual or semi-automatic processes described above and hence are well suited for sealing large quantities of dense materials.

With the apparatus and method of the present invention, the packager is also no longer restricted to materials of the heat sealable type. Thus, more conventional and less expensive materials, such as paper, may be used, with consequent economies to the packager.

It should also be noted that, because the longitudinal and transverse seals of the bags constructed by the present invention are not formed by heat sealing, packages several plies thick are easily produced.

The present invention also provides a novel tube former for folding the flat web of sheet material into an elongated tube. Thus, the tube former of the present invention is mathematically designed so that all points in a line perpendicular to the direction of travel of the web, travel at exactly the same speed as the web passes through the tube former. Problems of stretching, wrinkling and tearing are thereby eliminated, even in webs of multi-ply construction.

An additional feature is, that in carrying out the process of the present invention the packager need only purchase plain stock rolls, or at most, prepared rolls, of packaging material with considerable savings over the cost of purchasing finished or semi-finished bags.

Other features and advantages of the present invention will become apparent from the following description wherein:

FIGURE 2 is a similar view, although somewhat enlarged, with parts removed for clarity;

FIGURE 10 is an elevational view of the end paster of the present invention;

FIGURE 11 is a partial view of the end paster of FIGURE 10 showing parts thereof in a different position;

FIGURE 14 is a somewhat schematic elevational view of the end closure unit of the present invention;

FIGURES 15–20 are a series of elevational views showing the operations performed by certain elements of the end closure unit;

Figure 1:
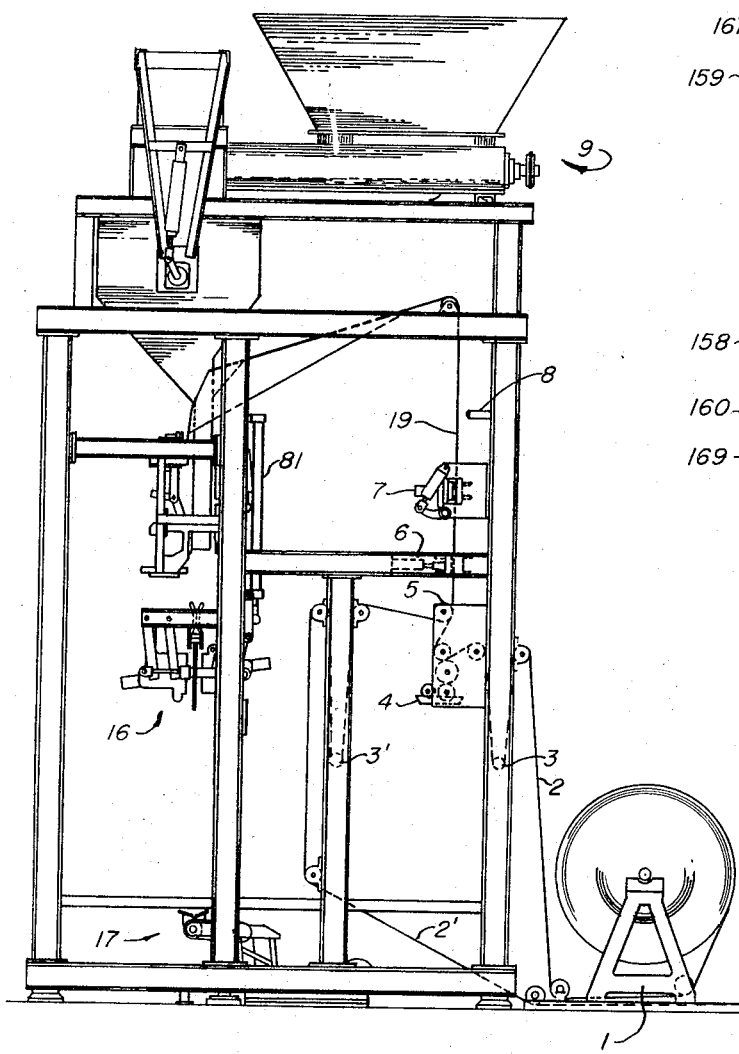
FIGURE 1 is an elevational view of the apparatus of the present invention showing the general arrangement of the elements thereof.

Referring now to FIGURES 1 and 2 of the drawings, the general arrangement of the elements of the apparatus of the present invention will now be described.

As therein shown, a framework of structural members supports the majority of elements while immediately adjacent thereto, tandem unwind stands 1 and 1' carry webs 2 and 2' of the packaging material. Mounted at the rear of the framework, for purposes to be presently described, are a series of idler rolls including dancer rolls 3 and 3'. Also found at the rear of the machine are a cross paster 4, combining roll 5, laminator 6, perforator 7 and electric eye 8. Atop the supporting framework, weighing and dispensing apparatus 9 is provided for measuring and discharging, at predetermined points in the process cycle, a preset amount of the material to be packaged. Just beneath the discharge chute of apparatus 9 is a tube former 10, preheater 11 and longitudinal seam paster 12; while adjacent, but beneath these elements are positioned pressure rollers 13, backup rollers 14, transverse seam paster unit 15 and end closure unit 16, including vertically reciprocal carriage 16'. At the lower forward portion of the machine, as best seen in FIGURE 2, are located the shaker unit 17 and conveyor 18.

With this general arrangement of parts in mind, the operation of the machine will now be briefly described.

As probably best seen in FIGURE 2, the webs 2 and 2' are each trained over a series of idler rolls including dancer rolls 3 and 3'. Web 2 then passes through the cross paster unit 4 to combining roll 5 where it joins web 2'. From there, the two webs pass through laminator 6, which bonds them together to form a laminated web 19. The laminated web 19 then receives a transverse line of perforations at perforator 7 and moves forward to tube former 10 where it is shaped into an elongated tube 20 having overlapping longitudinal edges. As the web 19 moves over the tube former 10, preheater 11 heats one longitudinal edge thereof, while longitudinal seam paster 12 applies a continuous stripe or stripes of a suitable adhesive. As the tube 20 emerges from the bottom of the tube former 10, pressure rollers 13 and backup rollers 14 bear against the overlapped edges thereof, bonding them together. Transverse seam paster unit 15 then applies a pair of transverse stripes of adhesive to opposite sides of the tube at positions which will subsequently become the top of one bag and the bottom of another. End closure unit 16, mounted on a vertically reciprocal carriage 16', then grips the tube and begins moving downwardly; simultaneously pulling a new length of bag material into place and forming the top end closure of a bag and the bottom end closure of the tube. As the end closure unit continues to move downwardly, the weighing and dispensing machine 9 is caused to dump a fresh charge of material into the tube. At the bottom limit of travel of the end closure unit 16, electric eye 8 senses that a bag length of material has been pulled through the apparatus and relays a signal to the end closure unit, causing it to open and release the top of a now filled and sealed bag and the bottom of the tube. As it does so, brake shoe 21 presses the web 19 against the tube former 10, preventing the weight of material now contained in tube 20 from pulling additional packaging material through the machine. The filled, sealed bag, of course, drops on conveyor 18, where it is carried away for shipment or storage. As the end closure unit 16 moves upwardly, shaker unit 17 extends from a retracted position, engages the sealed, lower end of the tube 19 and vibrates it, allowing the contents thereof to compact into a sufficiently small volume to be contained within the subsequently formed bag. The entire cycle is then repeated.

Before passing to the detailed description of the elements just described, it should be noted that, while the lower limit of travel of the end closure unit may be controlled by means of an electric eye, the remaining sequence of operations is conveniently controlled through the use of limit switches (not shown) engaged by the carriage 16' as it moves in its vertical path. In this manner synchronization of the various elements is attained, assuring that they perform their functions at appropriate times during a cycle.

Referring now in more detail to the specific elements of the combination, and particularly to that portion of the apparatus upstream of the tube former 9, it will be seen that the webs of packaging material 2 and 2' are unrolled from unwind stands 1 and 1', respectively, and passed over dancer rolls 3 and 3', respectively. Unwind stands 1 and 1' may be provided with suitable braking devices to maintain proper tension in the webs and prevent the possibility of slack draws and web snarls. Since end closure unit 16 moves upwardly and downwardly in a vertical plane, and each time it moves downwardly it draws a bag length of the web through the apparatus, the movement of the web upstream of the end closure unit would be intermittent unless means were provided to transform this intermittent motion into one of constant linear rate. This is accomplished through the use of dancer rolls 3 and 3', which are freely turning idler rolls journalled at their ends in vertical trackways (not shown) secured to the inner surfaces of the upright structural members of the apparatus. The rolls 3 and 3' are thus free to move in a vertical plane and thereby transform the intermittent motion of the web downstream thereof into a constant linear motion; allowing the rolls of packaging material mounted on the stands 1 and 1' to unwind at a substantially constant rate and thereby eliminate the excessive stresses which would be imposed on the webs in overcoming the inertia of the rolls each time the carriage 16' moved downwardly. The weight of the dancer rolls may be selected to provide the proper tension in the web or, if due to the fact that their size is fixed by other design considerations and their weight is excessive, suitable counterbalance means (not shown) may be provided. In either case, through the use of these rolls and braking devices on the unwind stands 1 and 1', the rolls of packaging material are kept turning at a substantially constant rate of speed and the inertia of these rolls must be overcome only at initial startup of the apparatus.

From dancer roll 3, web 2 is trained over a suitable idler roll to cross paster unit 4. As best seen in FIGURE 2, cross paster 4 comprises a pan 22, which acts as a reservoir for the adhesive to be applied to the web 2, a transfer roller 23, for applying adhesive to the surface of an applicator roll 24, the applicator roll 24, a metering roll 25 to insure that the proper amount of adhesive is transferred from the roller 23 to the applicator roll 24 and a backup roller 26 to maintain the web 2 in contact with the applicator roll. Since the webs 2 and 2' will not usually be continuously bonded together but only at bag length intervals, the adhesive applicator roll may conveniently be of the type which will perform this function. For example, the circumference of the applicator roll may be chosen to be equal to the length of the bag and a pair of raised portions provided on the surface of the roll, so that the adhesive is applied in a pair of closely spaced lines which will lie on either side of subsequently formed perforations. Since it is necessary to apply adhesive to a surface of only one of the two webs, web 2' does not receive an adhesive coating but instead passes directly from dancer roll 3 over a roller to combining roll 5. Of course, if it were desired to laminate together more than two webs, additional adhesive applicators would be provided as necessary.

Downstream from combining roll 5, laminating unit 6 is provided to bond the two webs 2 and 2' together under heat and/or pressure. As seen in FIGURE 2, laminating unit 6 may take the form of a heated stationary platen 27 and a heated movable platen 28 actuable by means of a hydraulic piston and cylinder arrangement 29. Through the use of suitable limit switches located in the path of carriage 16' and tripped by it as it moves upwardly, the movable platen 28 is caused to clamp the two webs 2 and 2' against the fixed platen 27 each time the motion of the web is halted. Since, at this point upstream of the dancer rolls 3 and 3', the web is moving intermittently in bag length intervals, the point of clamping between the platens 27 and 28 can easily be synchronized with cross paster 4 to insure that clamping takes place at points where the two lines of inter-ply adhesive have previously been applied by the cross paster unit.

After passing laminating unit 6, the web 19 moves through perforator 7. Perforator 7 comprises a stationary anvil member 30 and movable perforating knives 30' actuated by a hydraulic cylinder and piston 31. Clamping means 32, actuated by a hydraulically operated piston 32', is also provided for clamping the web at locations above and below the point where knives 30' will perforate the web. In a manner similar to that described above for laminator 6, suitable limit switches may be provided to insure that, each time movement of the web is halted, the clamping means 32 will engage the web and thereafter, the knives 30' will form a line of perforations at bag length intervals. Again, the operation of perforator 7 may be synchronized with the movement of the web so that the perforations will be imprinted intermediate the closely spaced areas of adhesive applied by the cross paster unit 4.

While the foregoing description visualizes a system wherein a plurality of webs of packaging material are combined and perforated on the packaging machine, it will be apparent that rolls of material could be provided prepared in a manner which would eliminate the necessity for the combining and perforating equipment. Thus, a single roll of multi-ply, packaging material, pre-perforated into bag lengths, could be used in place of the plurality of rolls of material described above. While rolls of material prepared in this manner would be somewhat more expensive than rolls of stock material, the initial cost of the packaging apparatus would be reduced through the elimination of dancer roll 3', cross paster 4, and laminating unit 7. In this type of installation, the roll of prepared packaging material would be placed on the unwind stand 1, trained over dancer roll 3, to a turning roller and then directly to the tube former 10.

Figure 4:
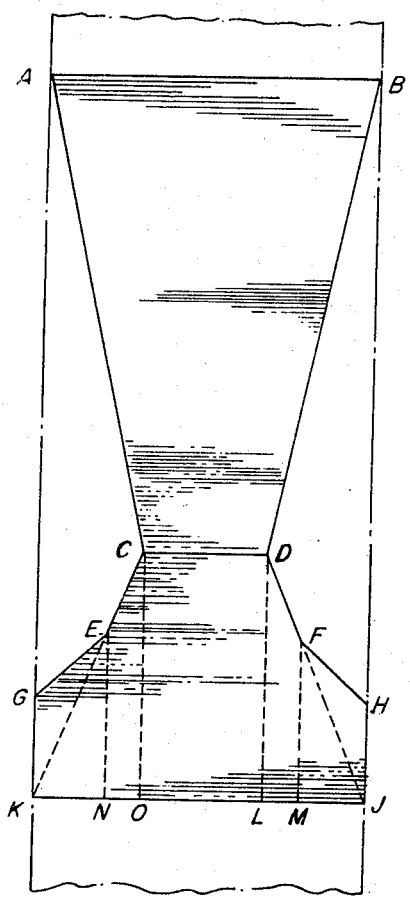
FIGURE 4 is a view of one embodiment of the tube former of the present invention with the surfaces thereof laid out in a single plane to better illustrate its development from a flat surface.
Figure 5:
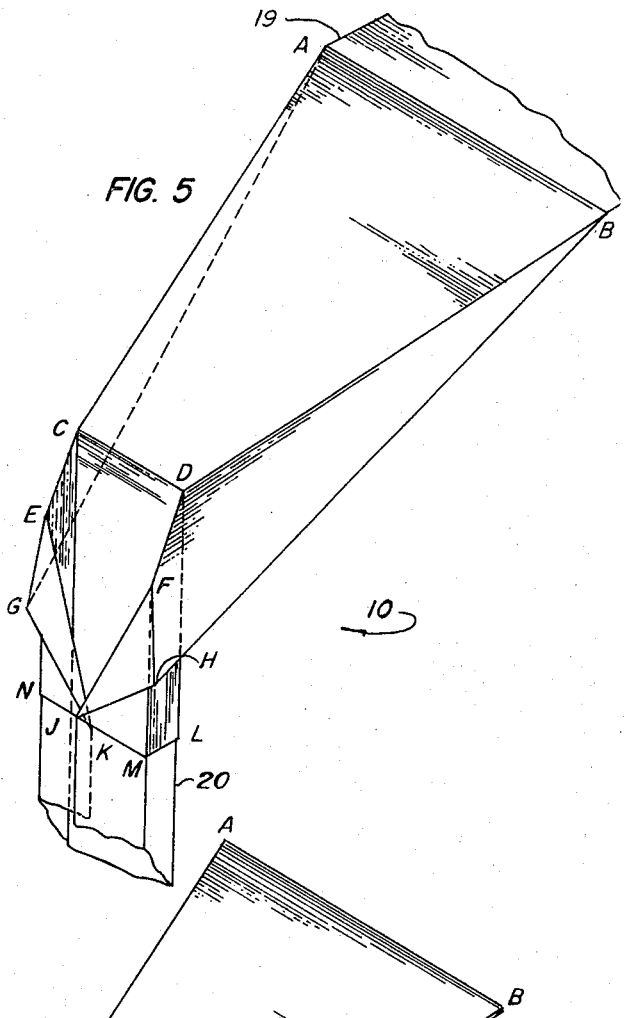
FIGURE 5 is a perspective view of the same tube former but with the surfaces thereof assembled.
Figure 6:
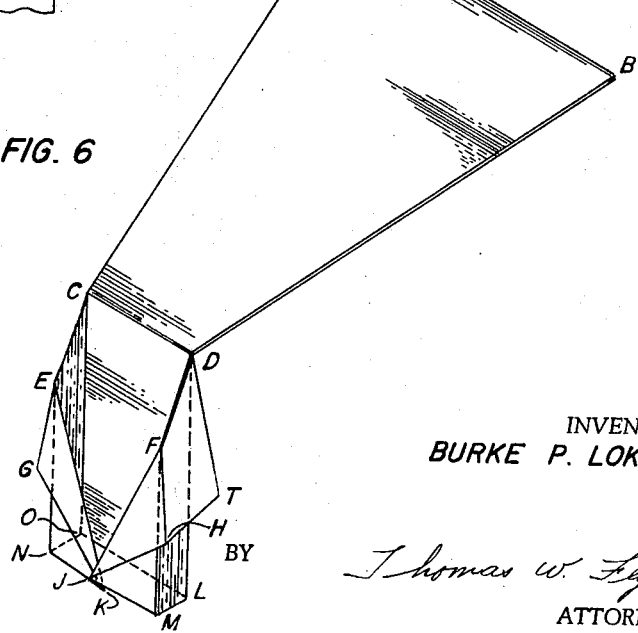
FIGURE 6 is a perspective view of another, slightly modified embodiment of the tube former.

Turning now to FIGURES 4–6 of the drawings, one preferred embodiment of the novel tube former of the present invention is shown in more detail. In FIGURE 5 the tube former 10 is shown with a web of material 19 passing thereover and being shaped into a gusseted, tubular configuration. As will be apparent from FIGURE 5, in this embodiment the tube former is composed entirely of flat planar surfaces and thus, lends itself readily to simple fabrication techniques. Thus, the tube former 10 comprises an approach surface ABCD joined at its forward end CD to rearward throat surface CDLO. Extending perpendicularly from rearward throat surface CDLO are side throat surfaces LDFM and OCEN. These in turn are joined to a forward throat surfaces MFJ and NEK, respectively, which are joined to triangularly shaped forward wing surface comprising substantially triangularly shaped elements JFH, and KEG, respectively. Joining the latter and approach surface ABCD are side wing surfaces BDFH and ACEG. From an inspection of FIGURE 4, it will be apparent that the tube former of the present invention is not only comprised entirely of flat planar surfaces for ease of fabrication but may be developed, without stretching or cutting, from a flat sheet of material. Therefore, it will be seen that if the tube former is developed from a sheet of material of the same width as the web which is to pass thereover, all portions of the web on a line perpendicular to the direction of travel of the web over the tube former surfaces will move at exactly the same rate of speed as the web moves over the former and stretching or wrinkling of the web will be entirely avoided.

Figure 24:
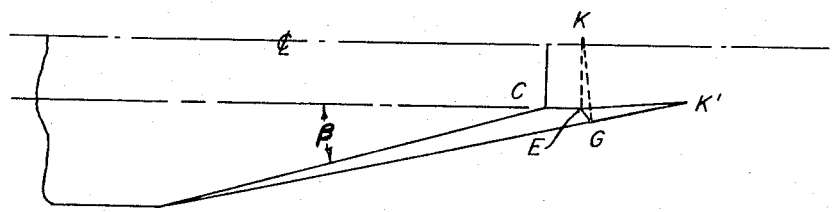
FIGURES 24 and 25 are figures depicting the manner in which the tube former of FIGURE 5 is designed to give a mathematically correct development from a flat to a tubular shape.
Figure 25:
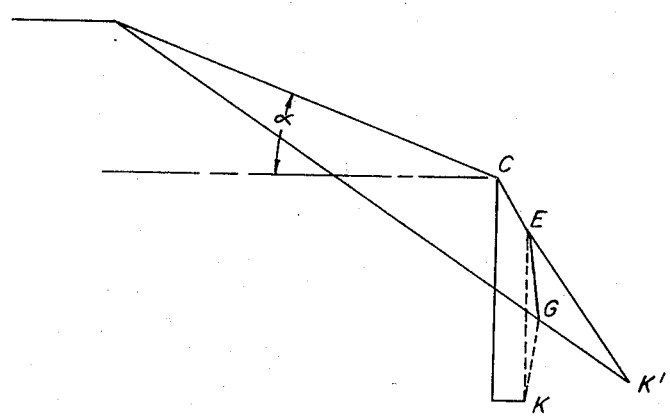

Referring now to FIGURES 24 and 25 of the drawings the manner in which the tube former of the present invention is developed from a flat sheet of material of the same width as the width of the web to be formed thereon will be described. Intially, certain dimensions will be governed by the size and shape of the bag desired to be formed. Thus, the width of the web, and the dimensions of the front, back, and side walls are selected, as well as the amount of overlap at the longitudinal seam of the bag. Next, depending upon the amount of space available, and thus, the overall height of the tube former desired, the angle alpha, hereinafter referred to as the vertical approach angle, between the approach surface and the horizontal is selected. Next, the angle beta, referred to hereinafter as the horizontal approach angle and representing the degree of convergence between the width of the web and the width of the bag, may be selected, again depending upon space limitations. It will be apparent from an inspection of FIGURES 24 and 25, that the greater the value of alpha and the smaller the value of the angle beta, the greater will be the height and length, respectively, of the approach surface. Hence, the values selected for these angles will be governed primarily by space considerations. Having now selected the width of the web and the dimension of the back wall of the bag, as well as the angles alpha and beta, the dimensions of plane ABCD may be determined either graphically or analytically. Next, using these dimensions and knowing that all points along a line transverse of the web will travel the same distance as the web moves over the tube former, the location of point E may be determined using a three-dimensional system of coordinates. Point G may then be arbitrarily selected; thereby establishing fold line EG and planes ACEG, GEK' and K'EN (see FIGURE 4). Knowing that point K in the top view, FIGURE 24, will lie somewhere along the forward throat surface, the position of which surface is in turn determined by the dimensions of the bag, and knowing the amount of overlap planned at the longitudinal seam, point K may be established in the plan view. Thereafter, the angle through which plane GEK' must be folded with respect to plane GECA to form the plane GEK may be determined graphically or analytically.

From the foregoing it will be apparent that an exact method of developing a tube former from a flat surface, and thus a former which will convert a flat web to a tubular shape without stretching or wrinkling the web, has been provided. It will also be noted that, because the web is necessarily under a uniform tension at all portions thereof as it moves over the former surfaces, the lines FM, DL, CO, and EN will form well-defined creases in the bag material; thereby providing gusset portions in the bag without the use of auxiliary gusset forming mechanisms. Additionally, since the web is under tension as it moves through the former, certain portions of the former may be deleted if desired. Thus, plane BDFH of the embodiment of FIGURE 5 may be eliminated, or, as shown in FIGURE 6, replaced by a smaller plane DFHT.

Figure 7:
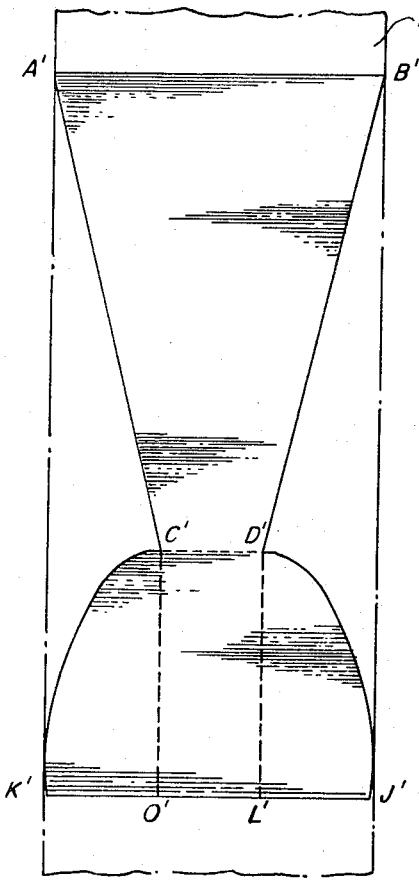
FIGURE 7 is a view similar to FIGURE 4 showing the layout of another embodiment of the tube former of the present invention.
Figure 8:
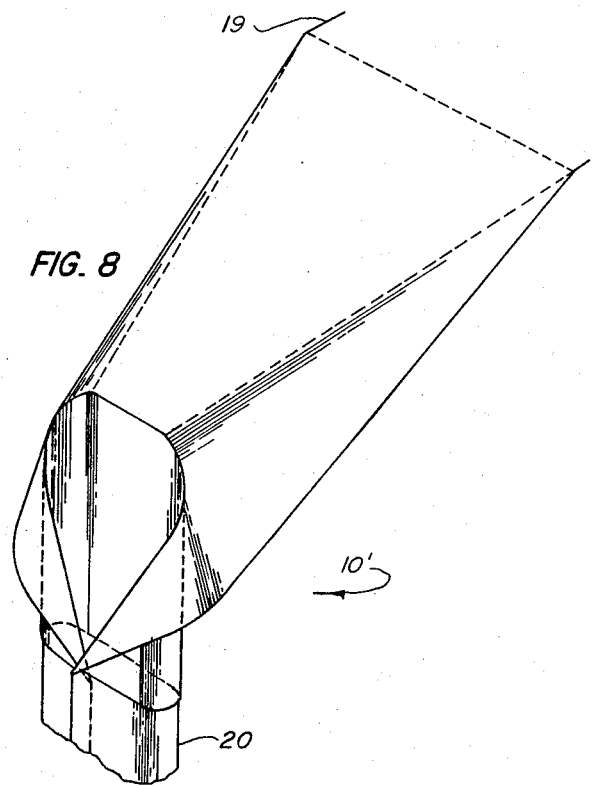
FIGURE 8 is a perspective view of the tube former of FIGURE 7.
Figure 9:
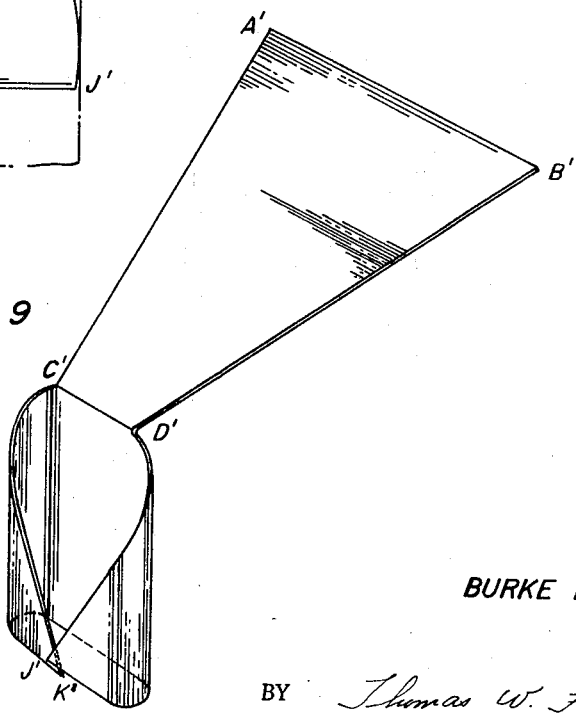
FIGURE 9 is a slightly modified embodiment of the tube former of FIGURE 8.

Referring now to FIGURES 7–9 of the drawings, a second embodiment of the tube former of the present invention is shown. Whereas in the former described supra, all surfaces are planar and are joined along straight lines, in the present embodiment, certain of these planar surfaces are replaced with curved surfaces. As will be noted from FIGURE 7, the curved tube former may also be developed from a flat sheet of material of the same width as the width of the web to be formed thereon. It will be apparent that, as in the case of the planar former, having once established the desired bag dimensions, longitudinal seam overlap, web width, and horizontal and vertical approach angles, the dimensions and relative disposition of the portions of the former may be solved for either graphically or analytically in a manner similar to that described for the development of the planar former. Again, as in the case of the planar former, since all portions of a web traveling over the former are in tension, some portions of the former may be eliminated, as shown in FIGURE 9. Of course, in either case, the length of the approach surface may be such that side wing surfaces are necessary to support the web at these points and prevent sagging caused by the weight of the web. While in both embodiments of the tube former described, a flat web may be transformed into a tubular shape without wrinkling or stretching, the planar former will be preferred in many installations since it is more easily fabricated and will automatically form the gusseted type of sidewall usually preferred for greater bag strength.

Referring again to FIGURE 2 of the drawings, it should be mentioned that the longitudinal seam paster 12 may take the form of either a roller applicator or, as shown schematcially in FIGURE 2, an extruder which extrudes a continuous stripe or stripes of adhesive upon the longitudinal edge of the web 19. Regardless of which type of applicator is selected, it should be noted that because multi-ply bags are usually formed with the longitudinal edges of the plies in a staggered or stepped configuration, the applicator should be capable of either applying a stripe of adhesive for each lamination or a single stripe sufficiently broad to cover the several stepped edges.

As the tubularly shaped web continuously emerges from the bottom of the tube former 10, the overlapped, adhesively coated, longitudinal edges of the tube pass between pressure rollers 13, which may be heated, if desired, and backup rollers 14. As somewhat schematically shown in FIGURE 2, backup rolls 14 may be stationary whereas pressure rolls 13 are attached to a pivotal linkage yieldingly urged, through the use of springs or the like, into engagement with the backup rolls 14.

Referring now to FIGURES 10 and 11 of the drawings, the transverse seam paster, referenced generally by the numeral 15 in FIGURES 1 and 2, is shown in detail. From FIGURE 10 it will be noted that this unit includes adhesive supply pans 33 and 33', applicator rolls 34 and 34', and doctor blades 35 and 35'. If the adhesives used are of the type which require heating prior to application, pans 33 and 33' may be heated electrically or otherwise to maintain the adhesive at the proper temperature. Considering now the left hand side of FIGURE 10, there is shown a reciprocating arm 36 fixed to a rotatable pivot shaft 37, which forms a movable pivot point. Also fixed to pivot shaft 37 is an actuating link 38. Thus, movement of the actuating link 38 about the pivot point formed by pivot shaft 37 causes a corresponding pivoting of reciprocating arm 36. Extending from pivot shaft 37 and pivotally attached thereto, is a retraction link 39. At its opposite end link 39 is rigidly attached to a retraction shaft 40 which, although rotatable, is restrained against translational movement and thereby provides a fixed pivot point for link 39. Journaled in one end of reciprocating arm 36, paste pad shaft 41 provides a pivot point for resilient paste pad 42, rigidly connected thereto. Also fixed to paste pad shaft 41 is a cam device 43 having a rotatable cam follower 44, rotatably secured to the end of the cam device opposite its connection to the shaft 41. Cam follower 44 is adapted to abut against camming surface 45 in a manner which will be presently described.

The transverse seam paster is designed to simultaneously apply two spaced stripes of adhesive to opposite sides of the tube to permit the formation of the top transverse seam of one bag and the lower transverse seam of another bag. The portion of the transverse seam paster just described will apply adhesive to form the top seam of a bag while the right hand side of FIGURE 10 shows the portion of the seam paster which will simultaneously apply the adhesive to form the bottom seam of the next bag. This portion of the transverse seam paster includes a reciprocating arm 36' rotating about a pivot point formed by a pivot shaft 37' and rigidly connected thereto. Also rigidly connected to pivot shaft 37' is an actuating link 38'; whereby pivotal movement of arm 36' about the pivot point formed by shaft 37' will cause a like movement of link 38'. Forming a fixed pivot is retraction shaft 40', connected to shaft 37' through link 39', which permits the assembly of arm 36', shaft 37', and link 38' to pivot about the fixed pivot formed by the retraction shaft 37'. At its outer end, arm 36' journals a rotatable paste pad shaft 41' having fixed thereto a resilient paste pad 42' and cam device 43'. Camming device 43' includes a cam follower 44' rotatably mounted at one end thereof and adapted to bear against the camming surface 45'. Interconnecting the retraction links 39 and 39' is a link 46 and interconnecting actuating links 38 and 38' is a rigid link 47. Also rigidly attached to pivot shaft 37' is turning link 48. At its opposite end, turning link 48 is pivotally attached to piston rod 49, slideably engaged in hydraulic cylinder 50. At its right hand end, as seen in FIGURE 10, retraction link 39' is provided with an extension 51, which in turn is pivotally attached to one end of piston rod 52, slidably engaged in a hydraulic cylinder 53.

Referring now to both FIGURES 10 and 11, the description of the operation of the transverse seam paster will be described. When at rest, the reciprocating arms 36 and 36' of the seam paster will be extending downwardly to the left and right, respectively, of the adhesive supply systems, while applicator rolls 34 and 34' continuously rotate and present a surface of wet, and if desired, warm adhesive. To apply adhesive to the tube of the packaging material, hydraulic cylinder 50 is pressurized, forcing hydraulic piston 49 downwardly and rotating turning link 48 clockwise about the pivot formed by pivot shaft 37'. Since reciprocating arm 36' is rigidly attached to shaft 37' this will cause arm 36' to pivot clockwise, as seen in FIGURE 10, towards the tube of packaging material. As this occurs, paste pad 42' will contact the surface of applicator roll 34'; thereby picking up a supply of adhesive. As arm 36' continues to pivot, cam follower 44' contacts camming surface 45' located on the frame of the packaging apparatus. Continued movement of the arm 36' causes the cam device 43' and the paste pad shaft 41', to which it is rigidly attached, to rotate paste pad 42', which is also fixed to the shaft 41', causing the paste pad to squarely meet the formed tube. Since actuating link 38' is also rigidly attached to pivot shaft 37', movement of the reciprocating arm 36' will cause a corresponding movement of link 38'. This movement is transferred to the corresponding actuating link 38 on the opposite side of the tube through the rigid link 47. Through a sequence of operations identical to that just described, paste pad 42 will simultaneously carry a supply of adhesive to the opposite side of the formed tube.

In order to prevent smearing of the adhesive as the paste pads 42 and 42' are withdrawn from contact with the tube, and prevent unnecessary contact with rollers 34 and 34' during such withdrawal, means are provided for first retracting the pads in directions substantially perpendicularly away from the surface of the tube prior to lowering the reciprocating arms downwardly to their positions of rest. As previously noted, retraction shafts 40 and 40' are fixed against translational movement; whereas pivot shafts 37 and 37' are free to revolve around the fixed pivots formed by shafts 40 and 40' as well as rotate about their own axes. Thus, after contact with the formed tube by the paste pads 42 and 42', appropriate limit switches cause hydraulic cylinder 53 to be pressurized; thereby moving piston rod 52 upwardly, rotating retraction link 39' and its extension 51 counterclockwise about the fixed pivot formed by shaft 40'. At the same time, cylinder 50 is depressurized, resulting in a translational movement of paste pad 42' in a direction substantially perpendicularly away from a surface of the tube of packaging material. Since retraction links 39 and 39' are interconnected by a rigid link 46, this same withdrawing movement is transferred from the right hand side of the seam paster, as seen in FIGURE 10, to the left hand side thereof, where the withdrawal operation is identical.

Thus, it will be seen, that through the operation of suitable control devices, the adhesive applicators of the transverse seam paster are caused to simultaneously pick up a supply of adhesive, apply this adhesive squarely on the formed tube without adhesive smearing, retract perpendicularly away from the opposite surfaces of the tube and return to their position of rest without contacting their respective applicator rolls during withdrawal.

Referring now to FIGURES 12–23 of the drawings and FIGURE 14 initially, the end closure unit, referenced generally by the numeral 16 in FIGURES 1 and 2, will now be described. As shown in FIGURE 14, the end closure unit comprises a vertically reciprocal carriage 16' formed of suitable structural members, as at 54, which in turn pivotally support links 55–58, which at their lower ends are pivotally attached to schematically shown end closure jaws 59 and 60. Attached to jaw 60 through a pivoted connection at one end thereof, is a hydraulic cylinder 61 slideably receiving a piston member 62. Since the hydraulic cylinder 61 is pivotally attached, as at 63, to jaw 60, and piston 62 is pivotally attached to jaw 59 by pivot 64, actuation of the hydraulic cylinder and piston arrangement will cause the jaws to move towards or away from another. While only four links and one hydraulic cylinder and piston arrangement have been described it will be understood that a duplicate system exists on the opposite side of the apparatus. Thus, there will be a total of 8 links, four on each side, supporting the end closure jaws and two hydraulic cylinder and piston arrangements, one on each side, for actuating the jaws.

In accordance with the principles of the present invention, means are also provided to insure synchronization of the jaws 59 and 60 to make certain that when they are drawn together their opposing surfaces abut at the center line of the machine. As seen in FIGURE 14, this means comprises rotatable shafts 65 and 66 to which support links 56 and 57 are fixed at their upper ends. Also attached to shafts 65 and 66, as at 67 and 68, are rods 69 and 70 bearing gear segments 71 and 72 at their outer ends. It will be seen that through the intermeshing of the teeth on gear segments 71 and 72, jaws 59 and 60 are caused to move through identical arcs upon actuation of the hydraulic piston and cylinder arrangement 61 and 62 and meet squarely at the center line of the machine.

As noted previously, end closure unit 16 is mounted upon a vertically reciprocal carriage 16', the operation of which will now be described. At the right hand side of FIGURE 14, will be seen a structural member 73 of the supporting framework of the apparatus. Attached to the inner surface of the structural member 73 and a similar member on an opposite side of the machine are a pair of elongated plate members 74 and 74' (see FIGURE 12) which extend the length of the path of travel of the vertically reciprocal carriage 16'. Attached at either side near the rear thereof, carriage 16' carries plate members 75 and 75' each bearing two pairs of rollers, as at 76–79 in FIGURE 14, in rolling engagement with opposite sides of the plate member 74. As will be seen in FIGURES 12 and 13, plate members 74 and 74' also carry toothed racks 96 and 96' the teeth of which are in intermeshing engagement with pinions 97 and 97' each rigidly mounted on a common shaft 98. Pivotally attached to the back of the carriage is a hydraulic piston rod 80 slideably received in hydraulic cylinder 81, which in turn is pivotally attached at its upper end, as seen in FIGURE 1, to a structural member of the supporting framework. Thus, it will be seen that through an appropriate valving arrangement, pressurized fluid may be admitted to alternate sides of the hydraulic cylinder 81, causing the vertically reciprocal carriage 16' to move upwardly and downwardly, with the rollers attached to plate members 75 and 75' engaging the tracks provided by members 74 and 74'. Through the rack and pinion arrangement 96, 97 and 96' and 97', skewing or cocking of the carriage as it moves upwardly and downwardly is prevented.

Figure 12:
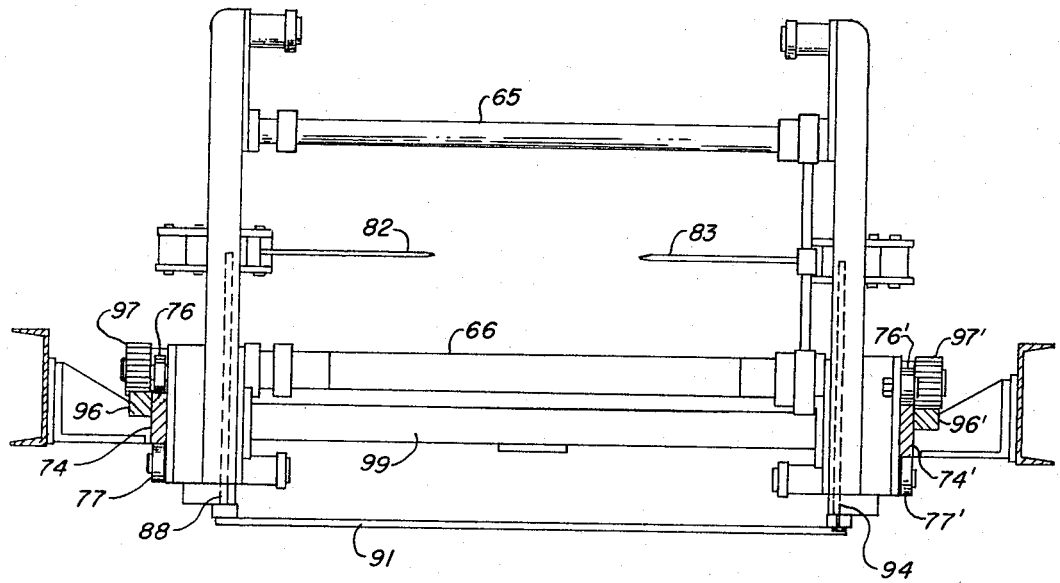
FIGURE 12 is a top view of the end closure unit with parts removed for clarity.
Figure 13:
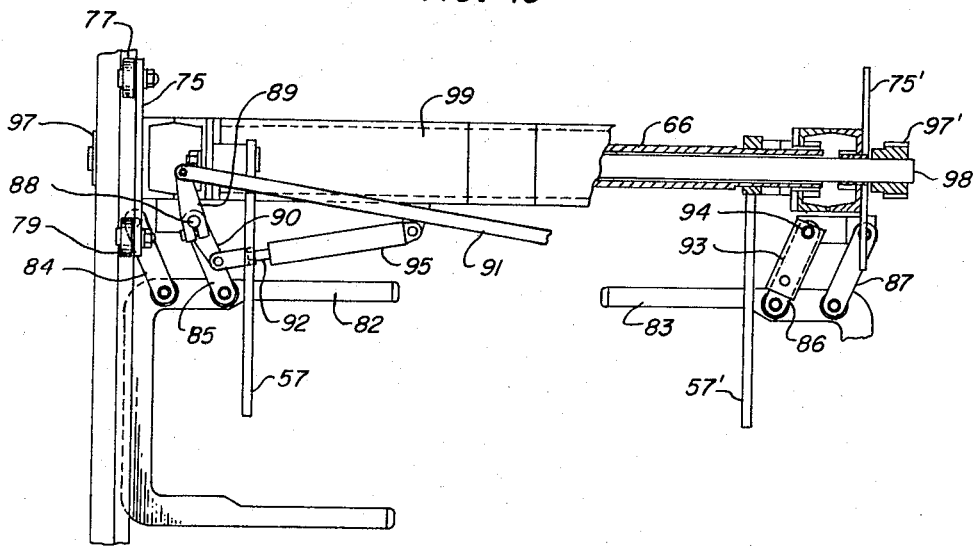
FIGURE 13 is an elevational view of the structure shown in FIGURE 12.

As best seen in FIGURES 12–14 of the drawings, the end closure unit 16 also includes means for folding the gusset portions of the tube inwardly prior to the clamping and sealing thereof. This means includes tuckers 82 and 83 of U-shaped configuration, mounted for translational movement toward and away from each other in directions perpendicular to the movement of the end closure jaws by means of links 84–87 pivotally attached at their upper ends to the carriage and at their lower ends to the tuckers. Link 85, at its upper end, is rigidly attached to one end of a shaft 88, which at its opposite end has rigidly secured thereto links 89 and 90. Link 89, at the end opposite its connection to shaft 88 is pivotally connected to a rigid interconnecting link 91 while link 90, at its end opposite its connection to shaft 88, is pivotally connected to hydraulic piston rod 92. Link 91 extends across the apparatus to a pivoted connection with link 93 which is also rigidly attached to shaft 94. Slidably receiving piston rod 92 is a hydraulic cylinder 95 which is pivotally attached to a structural member 99 of the movable carriage. It will thus be apparent that upon pressurizing alternate sides of the piston of the hydraulic piston and cylinder arrangement 92, 95, link 90 will be caused to rotate about the pivot formed by shaft 88, resulting in rotational movement of shaft 88 about its axis and pivotal movement of link 85; whereby tucker 82 is caused to move inwardly and outwardly. Simultaneously, through the linkage system 89, 91, 93, the shaft 94 and link 86 rigidly attached thereto, a corresponding movement of tucker 83 is effected.

Referring now to FIGURES 15–23 of the drawings, the folding and clamping mechanisms of the end closure unit 16 will be described in detail. As shown in FIGURE 15, each of the jaws 59 and 60, includes a folding mechanism 100 and 100', respectively, and a clamping mechanism 101 and 101', respectively. Folding mechanisms 100 and 100' may each comprise a pair of bell-crank shaped arms 102 and 102', only one arm of each pair being shown in FIGURES 15–20, mounted on opposite sides of the machine by means of shafts 103 and 103', and bearing at their outer ends substantially wedge-shaped nose portions 104 and 104', which extend across the width of the machine. Nose portions 104 and 104' may conveniently be made of Teflon or some similar material which exhibits a tendency to resist adhesion, since these portions may occasionally come in contact with the adhesive applied by transverse seam paster 15. Adjacent the ends of the bell-crank arms, hydraulic cylinders 105 and 105' are pivotally attached as at 106 and 106', respectively; while slideably received in cylinders 105 and 105' are piston rods 107 and 107', pivotally attached to the jaws 59 and 60 at 108 and 108'. Thus, upon actuation, of the hydraulic piston and cylinder combinations the bell-crank arms will pivot about shafts 103 and 103' causing the nose portions 104 and 104' to engage opposite sides of the tube of packaging material 20.

Also mounted on end closure jaws 59 and 60 are a pair of top clamping surfaces 109 and 110 and an identical but opposite pair of lower clamping surfaces 109' and 110'.

Figure 21:
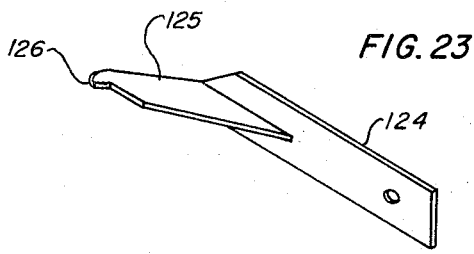
FIGURE 21 is an enlarged fragmentary view of the clamping mechanism of the end closure unit.
Figure 23:
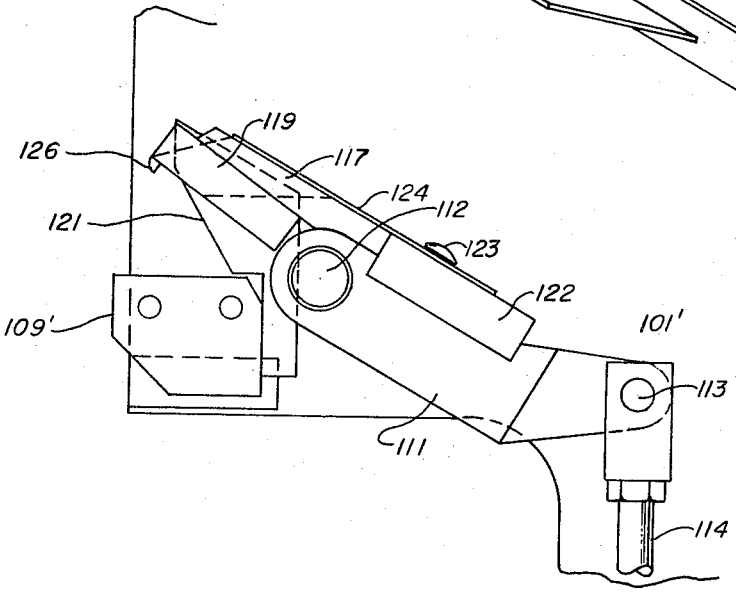
FIGURE 23 is a perspective view of a spring member forming a part of the clamping mechanism.
Figure 22:
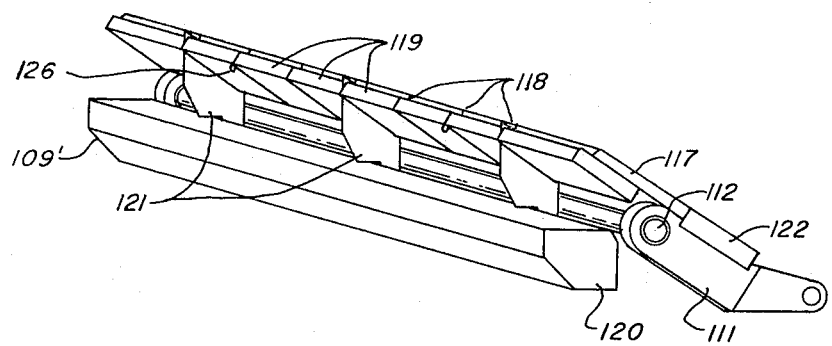
FIGURE 22 is a perspective view of the apparatus shown in FIGURE 21.

Referring now to FIGURE 21 of the drawings, it will be noted that clamping mechanism 101' comprises a body portion 111 pivotally mounted on a shaft 112 and having pivotally attached thereto as at 113, a hydraulic piston 114. Piston 114 is slideably received in a hydraulic cylinder 115 which at one end is pivotally attached, as at 116 to an end closure jaw. Extending outwardly from body portion 111 is a slotted plate member 117 having formed therein a series of slots 118. Secured to the under-surface of plate member 117 are a series of smaller plate members 119 spaced apart slightly along their edges with the spaces between adjacent plates 119 aligned with the slots 118 formed in plate member 117 to form continuous passages. As best seen in FIGURE 22, previously described clamping surface 109' is formed as the front surface of an anvil member 120. Rigidly attached to the back surface of anvil member 120 are a series of vertically extending flat plates, 121, having a forward edge extending at an acute angle to the upper surface of the anvil 120 and extending upwardly between some of the continuous passages formed by the edges of spaced plates 119 and slots 118. Also mounted on the upper surface of body portion 111 is a rectangularly cross-sectioned bar 122 having attached thereto by rivets or the like 123, spring members 124, which overlie some of the previously mentioned continuous passages. As can be seen in FIGURE 23, mounted at the outer ends of spring members 124 are trapezoidally shaped plates 125 extending perpendicularly away from spring member 124 and, terminating in hooks 126.

Turning once again to FIGURE 15, it will be noted that adjacent the upper clamping surfaces 109 and 110, plate members 127 and 128 are pivotally mounted as at 129 and 130, respectively. Link members 131 and 132 are also pivotally attached at one of their ends to the upper ends of plate members 127 and 128, and at their opposite ends, as at 133 and 134, to a portion of the movable carriage member 16'.

Figure 17:
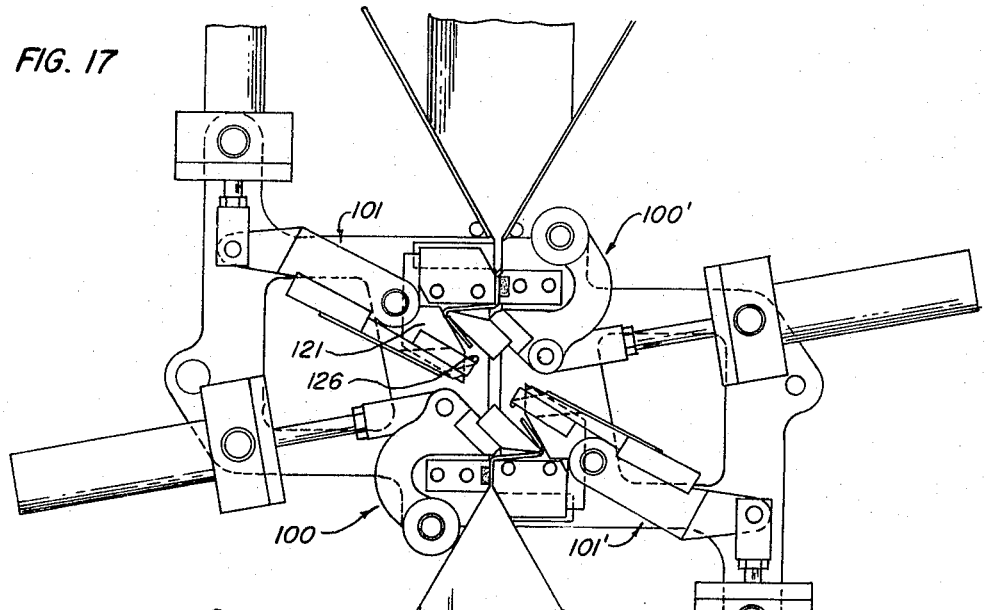
Figure 18:
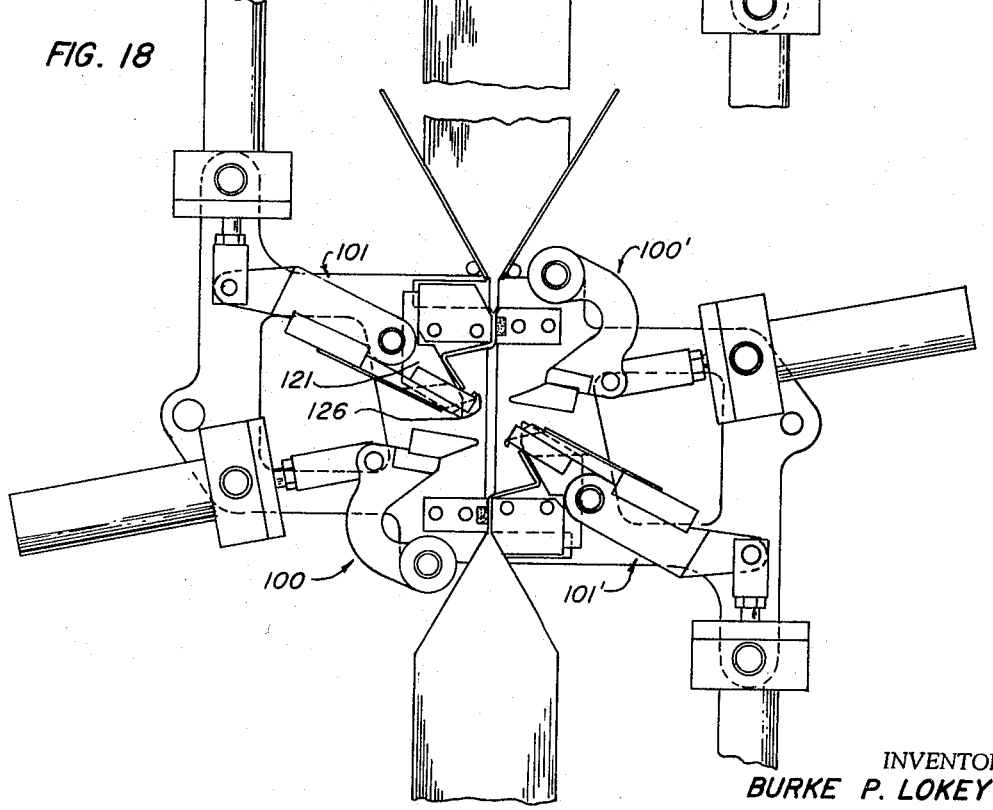
Figure 19:
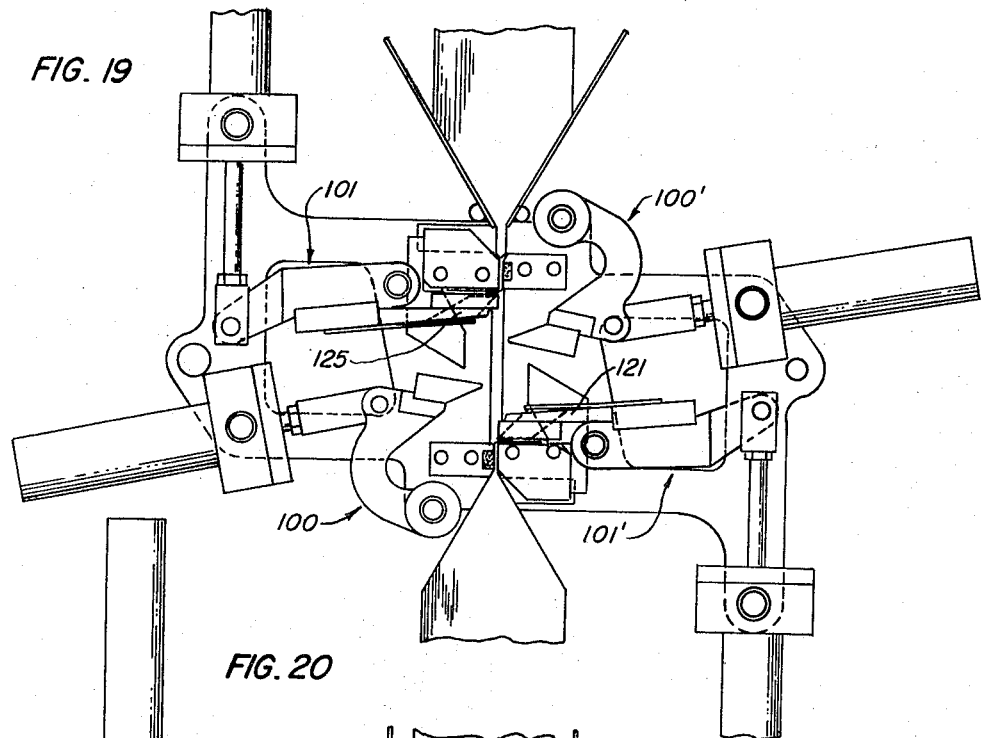
Figure 20:
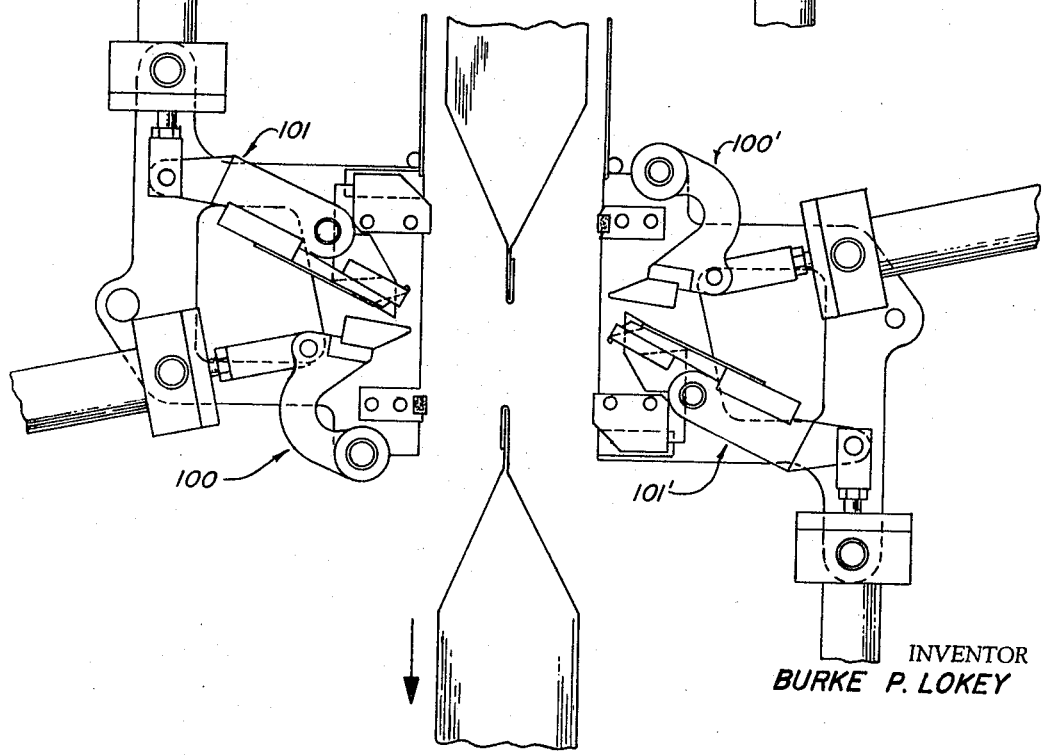

Considering now FIGURES 12–23 of the drawings, the operation of the end closure unit 16 will be described. In the position shown in FIGURE 15, the movable carriage 16', mounting jaws 59 and 60 and tuckers 82 and 83, has moved upwardly to a point just short of the upper limit of its travel. At this time jaws 59 and 60 are fully spaced apart with the tube packaging material 20 therebetween. Tucker fingers 82 and 83 are similarly spaced apart adjacent the sides or gussets of the tube and plate members 127 and 128 extend upwardly in substantially parallel relationship. Immediately thereafter, tuckers 82 and 83 move inwardly, as shown in FIGURE 13, to establish folds in the sidewalls or gussets of the tube 20 and jaws 59 and 60 move together, clamping tube 20 between the upper clamping surfaces 109 and 110 and lower clamping surfaces 109' and 110', above and below, respectively, a line of perforations 135 as previously formed by perforator 7. The entire end closure unit 16 then begins to move downwardly, pulling a new length of bag material into position. As the end closure unit 16 continues to move downwardly, weighing and dispensing apparatus is actuated through suitable limit switches, not shown, to dump a premeasured charge of material into the partially formed upper bag. As the charge of material falls into the tube and comes to rest, plates 127 and 128, which have now moved inwardly as shown in FIGURE 16, support the bag against undue stresses which would be caused by the impact of the falling material. Folding mechanisms 100 and 100' then begin to pivot about shafts 103 and 103', respectively, bringing the nose portions 104 and 104' into contact with the tube 20 between the clamping surfaces 109, 110, 109', 110' and breaking the tube, as shown in FIGURE 16, along the line of perforations 135. As shown in FIGURE 17, continued pivoting of the arms 100 and 100' causes the severed edges of the bag material to be tucked between the upper surfaces of the anvil members 119 and the forward edges of the plate members 121 to form acutely bent folds. As the nose portions 104 and 104' withdraw from the folded ends of the bag material, hooks 126, FIGURE 18, prevent the packaging material from springing out from between anvils 120 and plates 121. As the end closure unit 16 continues to move downwardly, clamping mechanisms 101 and 101', as seen in FIGURE 19, firmly press the folds established in the ends of the bag material against the anvils 120. Since hooks 126 are attached to bar 122 by means of spring members 123, the hook portions are allowed to withdraw slightly between the continuous passages formed by the slots 118 and spacing of plates 119; thus not interfering with the clamping action at the end of the bag and tube. This clamping action is maintained as the end closure unit continues to move downwardly, allowing the adhesive which had previously been applied to the interior of the folds by end paster 15 to set. An electric eye 8 (see FIGURE 2), by sensing the presence of certain marking indicia imprinted on the laminated web 19, indicates when a complete bag length of packaging material has been drawn through the apparatus and through appropriate switch mechanism, halts downward movement of the end closure unit 16, and causes clamping mechanisms 101 and 101' to pivot away from anvils 120 and jaws 59 and 60 to retract. As shown in FIGURE 20, the now completely filled and sealed bag is allowed to drop downwardly onto a discharge conveyor and the end closure unit begins to move upwardly to repeat the cycle just described.

Figure 3:
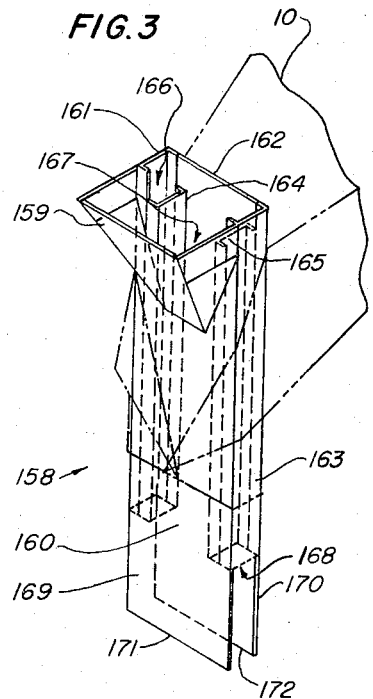
FIGURE 3 is a prespective view of a filling spout and extension plates thereof used in conjunction with the tube former of the present invention, the latter being shown in phantom lines.

Considering now, FIGURE 3 of the drawings, an additional feature of the present invention, which enhances the sack filling and gusset forming operations, will be described. As seen in FIGURE 3, a rectangular, tubular member 158, having an enlarged portion 159 at its upper end adapted to be attached to the lower end of the discharge spout of the weighing and dispensing mechanism 9 is provided. Tubular member 158 is adapted to fit within the throat of the tube former 10, shown in phantom lines, with its four exterior walls 160–163 in spaced, concentric relationship to the interior throat surfaces of the tube former. Interiorly of tubular member 158 will be seen a pair of vertically extending partitions 164 and 165 dividing the tube into three longitudinally extending passageways 166–168, with passageways 166 and 168 being considerably smaller than passageway 167 and extending on either side thereof. Depending from the front and back walls 160 and 162 are a pair of resilient extension plates 169 and 170 terminating in free edges 171 and 172.

In operation, filling material passing from the discharge spout of the weighing and dispensing mechanism 9, travels through passageway 167 of the tubular member and into the closed end tube 20; while any air entrapped in the tube is allowed to escape through the smaller passageways 166 and 168. It will be seen that without the provision of passageways leading to and from the interior of the closed end tube, air entrapped in the tube by the mass of material being deposited therein could only escape by passing upwardly through the material itself. This would not only retard the rate of filling but would also aerate the product and increase its volume to a point where subsequent, top sealing would be seriously hampered.

With regard to the resilient extension plates 169 and 170, their primary function is to serve as backing members for the front and back walls of the tube during the gusset tucking operation described supra. Thus, as tuckers 82 and 83 move inwardly just prior to engagement of the tube by the end closure unit 16, the plates 169 and 170, underlying the front and back walls of the tube, serve to insure the formation of straight, well formed fold lines at the junctures of the front and back walls with the gussets. At the same time, the resilient nature of the plates allows their free ends 171 and 172 to move inwardly to accommodate the inward movement of the front and back walls caused by the tucking of the gussets.

Figure 26:
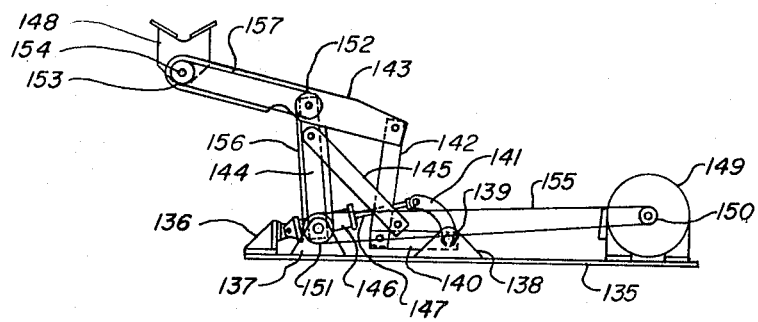
FIGURE 26 is an elevational view of the shaker unit of the present invention.

Referring now to FIGURE 26 of the drawings, the shaker unit, referenced by the numeral 19 in FIGURES 1 and 2, will be described. Shaker unit 19 comprises a base plate 135, fixed with respect to the rest of the apparatus, and bearing pivot supports 136, 137 and 138. Pivot support 138 journals a shaft 139 extending therefrom across to an identical pivot support. Fixed to shaft 139 is a link 140 and a bell crank 141. At its opposite end, link 140 is pivotally attached to a second link 142, which in turn is pivoted at its outer end to lever 143. Pivotally attached to pivot support 137 is a link 144, which at its opposite end is also pivotally connected to lever 143. Extending between links 140 and 144 is a link 145 pivotally attached thereto intermediate their ends. Extending from pivot support 136 and pivotally attached thereto is a hydraulic cylinder 146 slideably receiving piston rod 147, which in turn is pivotally attached at its other end to bell crank 141. It will thus be apparent that upon extension of piston rod 147 from hydraulic cylinder 146, bell crank 141 will be cause to rotate clockwise, turning shaft 139 and link 140 in the same direction. Clockwise movement of link 140, through the medium of interconnecting link 145, will also cause clockwise rotation of link 144 about its lower pivot point. At the same time link 142 will be caused to displace upwardly and rearwardly from the nearly vertical position shown in FIGURE 26, causing lever 143 to tilt downwardly and rearwardly. It will thus be seen, that upon extension of the piston rod 147, the bag engaging portion 148 of the shaker unit will be retracted from a position in which it may engage the bottom of a filled sack. Conversely, upon retraction of the piston rod 147, bag engaging portion 148 will move forwardly and upwardly to the position shown in FIGURE 26 to engage the filled sack.

Positioned to the rear, or right hand side, as seen in FIGURES 2 and 26, is a motor 149 bearing sprocket 150. Adjacent pivot support 137 and having its axis aligned therewith, is a second sprocket 151 and mounted on lever 143 and having its axis coincident with the pivot connection between lever 143 and link 144 is sprocket 152. Mounted at the outer end of lever 143 is a fourth sprocket 153 having eccentrically mounted thereon shaft 154, which in turn, is journaled in the lower end of the bag engaging portion 148. Interconnecting sprockets 150 and 151 is a chain member 155, while a similar chain 156 interconnects sprockets 151 and 152 and a third chain 157 interconnects sprockets 152 and 153. Thus, rotational movement imparted from motor 149 to sprocket 150 is transferred through sprockets 151 and 152, and chains 155, 156, and 157 to sprocket 153, where it is transformed to an eccentric or vibratory motion in the bag engaging portion 148 through the eccentric mounting of shaft 154 on sprocket 153. Since the distances between sprockets 150 and 151, 151 and 152, 152 and 153, remain constant regardless of the positions of the links of the shaker unit, the tension in chains 155–157 will remain constant at all times.

Having now described the various elements of the packaging apparatus in detail, the operation of the machine of the present invention will be considered.

Referring to FIGURES 1 and 2 of the drawings and assuming that a two-ply bag is to be formed from stock rolls of packaging material, the rolls are first placed on the unwind stands 1 and 1' and the webs 2 and 2' unrolled and threaded through the various components of the machine. The hopper for the weighing and dispensing mechanism 9 is then filled with the material to be packaged and the weight or amount of material to be packed in each bag is preset. Since this apparatus does not per se, form a part of the invention, it may be any of several types commercially available which will automatically discharge a predetermined amount of material from a storage hopper.

As automatic operation of the packaging apparatus commences, end closure unit 16, including vertically movable carriage 16', end closure jaws 59 and 60, and tuckers 82 and 83, moves upwardly and clamps the tube of packaging material 20 between opposed clamping surfaces above and below a line of perforations extending across the tube. Just prior to this clamping action, tuckers 82 and 83 are actuated through limit switches (not shown) and move inwardly to fold the gusset portions of the tube into flat folds.

As the end closure unit is moving upwardly, the packaging material is at rest and at this time end paster 15, also actuated by means of limit switches, causes transverse stripes of adhesive to be applied just above and just below the next line of perforations in the tube on the right and left hand sides thereof, respectively. It is also at this time, while the packaging material is not moving through the machine, that laminator 6 and perforator 7 are actuated to bond the plies 2 and 2' together and form a transverse line of perforations in the laminated web, respectively.

End closure unit 16 then begins to move downwardly pulling a new length of bag material into place. As this downward movement occurs, the folding and clamping mechanisms begin to operate to break the tube at the line of perforations and fold and clamp the severed ends of the tube. As it moves downwardly, end closure unit 16 trips a limit switch which causes the weighing and dispensing apparatus to discharge a preset amount of the material to be packaged into the tube 20 which is now sealed off at its lower end by the upper, opposing clamping surfaces 109 and 110. It should also be noted that as the end closure unit 16 begins its initial downward movement, an immediate reaction is that the dancer rolls 3 and 3' begin to move upwardly in their vertical trackways, thereby relieving the webs 2 and 2' from the stress that would otherwise be imposed if the movement of the web was transmitted directly to the unwind stands. Of course, as the new length of bag material is drawn through the machine the cross paster 4 applies pairs of adhesive stripes to web 2 at bag length intervals, the tube former 10 shapes the flat web 19 into the tubular form 20, the longitudinal seam paster 12 applies adhesive to a longitudinal edge of the web and pressure and backup rolls 13 and 14 seal the overlapping edges of the tube.

Electric eye 8, through the use of appropriately spaced indicia printed on the laminated web 19, senses when a complete bag length has been pulled through the machine by the end closure unit 16 and actuates suitable switch mechanism to halt the downward movement thereof. The end closure jaws 59 and 60 then move apart to drop a filled, sealed bag on the conveyor 18 and the end closure unit begins to move upwardly to repeat the cycle just described. As previously noted, at this point hydraulically actuated brake shoe 21 clamps the web against the approach surface of the tube former 10 and prevents the weight of material in the closed ended tube from pulling additional packaging material through the machine.

As the end closure unit moves upwardly, an actuating switch is tripped which brings shaker unit 17 upwardly and allows the vibrating bag engaging portion 148 thereof to come into contact with the sealed end of the tube containing the freshly discharged contents. Through the vibrating action of member 148 the contents of the tube are settled into a sufficiently small volume to allow a second transverse seal to be formed thereabove. As the end closure unit approaches the upper limit of its travel and the downward cycle is about to begin, a limit switch is tripped causing shaker unit 17 to be retracted and completing a full cycle of the packaging apparatus.

While the operation of a machine utilizing a pair of webs of stock material has been described, it will be apparent, as noted supra, that any number of webs could be used. On the other hand, a single roll of multi-ply, laminated, packaging material, perforated at bag length intervals, could be provided in place of the several rolls of stock material and one unwind stand, one dancer roll, and the cross pasting and perforating equipment dispensed with.

From the foregoing it will be apparent that applicant has devised a novel method and apparatus wherein a roll or rolls of packaging material and the product to be packaged are combined in a continuous, fully automatic process to form a filled, sealed sack. It should also be noted that in achieving these results applicant has devised a novel tube former device which transfers a flat web of material into a tubular shape without stretching or wrinkling of the web. Additionally, the end closure unit of the instant invention is capable of forming folded, pasted end closures on a variety of materials in a manner which, prior to the present invention was obtainable only through manual or semi-automatic operations.

While a specific detailed embodiment of the apparatus of the present invention has been disclosed, it will be apparent to those skilled in the art that various changes may be made within the scope of the appended claims.

I claim:
1. Apparatus for continuously forming a web of sheet material of indefinite length into a tube, the forming surfaces of said apparatus including an approach surface, a forward throat surface and a rectangular rear throat surface and wherein the improvement comprises:
   (a) all of said forming surfaces are substantially flat, planar surfaces,
   (b) said approach surface is substantially trapezoidal in configuration,
   (c) said rear throat surface is joined along one of its sides to the shorter parallel side of said approach surface, and
   (d) the dimensions of said forming surfaces are proportioned relative to each other such that said tube forming apparatus may be developed from a rectangular sheet of material having a length equal to the total length of said approach surface and said rear throat surface and a width equal to the width of the longer parallel side of said approach surface.
2. The apparatus of claim 1 wherein:
   (a) said forward throat surface comprises a pair of substantially triangularly shaped elements, and
   (b) said substantially triangularly shaped elements are positioned with corresponding portions thereof in overlapping relationship.
3. The apparatus of claim 2 wherein:
   (a) said rear and forward throat surfaces are joined in spaced relationship to each other by a pair of side throat surfaces.
4. The apparatus of claim 3 wherein:
   (a) said substantially triangularly shaped elements are joined to forward wing surfaces, and
   (b) each of said forward wing surfaces are also substantially triangular in shape and overlie a portion of a corresponding triangularly shaped element.
5. The apparatus of claim 4 wherein:
   (a) said forward wing surfaces are joined to said approach surface by a pair of side wing surfaces.

References Cited
UNITED STATES PATENTS

| | | | |
|---|---|---|---|
| 2,940,408 | 6/1960 | Monsees el al. | 93—82 X |
| 3,082,586 | 3/1963 | Schneider et al. | 53—182 |
| 3,090,174 | 5/1963 | Kraft | 53—25 X |
| 3,133,390 | 5/1964 | Leasure et al. | 53—180 |
| 3,155,018 | 11/1964 | Kirsten et al. | 93—82 |

BERNARD STICKNEY, *Primary Examiner.*

FRANK E. BAILEY, *Examiner.*

N. A. ABRAMS, *Assistant Examiner.*